United States Patent [19]

Maag

[11] 4,166,323

[45] Sep. 4, 1979

[54] GEAR TESTER FOR PROFILE AND LEAD TESTING

[75] Inventor: Oskar Maag, Zurich, Switzerland

[73] Assignee: Maag Gear-Wheel & Machine Co. Ltd., Zurich, Switzerland

[21] Appl. No.: 505,908

[22] Filed: Sep. 13, 1974

[30] Foreign Application Priority Data

Sep. 14, 1973 [CH] Switzerland ............... 13255/73
Dec. 28, 1973 [DE] Fed. Rep. of Germany ....... 2364916

[51] Int. Cl.² ................... B23Q 17/16; G01B 5/20
[52] U.S. Cl. ........................... 33/179.5 R; 33/174 PC
[58] Field of Search ......... 33/179.5 R, 169 R, 147 M, 33/1 M, 125 C, 174 P, 174 PC

[56] References Cited

U.S. PATENT DOCUMENTS

| | | | |
|---|---|---|---|
| 2,982,028 | 5/1961 | Donohoe | 33/179.5 R |
| 3,099,883 | 8/1963 | Bergemann | 33/179.5 R |
| 3,122,839 | 3/1964 | Muller | 33/179.5 R |
| 3,605,909 | 9/1971 | Lemelson | 33/174 PC |
| 3,631,603 | 1/1972 | Munro | 33/179.5 |
| 3,639,993 | 2/1972 | Sartorio | 33/174 P |
| 3,675,331 | 7/1972 | Ernst | 33/125 C |
| 3,741,659 | 6/1973 | Jones | 33/179.5 |

Primary Examiner—Richard E. Aegerter
Attorney, Agent, or Firm—Toren, McGeady and Stanger

[57] ABSTRACT

Gear testing apparatus has a tooth flank probe or feeler displaceable in a spatial co-ordinate system by being mounted on a series of three support members each movable in a different direction. Scales monitoring the member movements feed member position data to a computer in which a movement programme is stored. In one arrangement, the computer programme controls movements of all three members and deviations in tooth flank form cause deflections of the feeler that are evaluated by the computer. In another arrangement, two of the members are driven by the programme data and the third member is displaced by biassing means to hold the feeler against a tooth flank, the computer comparing said displacements with reference values to evaluate deviations in the tooth flank form.

7 Claims, 2 Drawing Figures

GEAR TESTER FOR PROFILE AND LEAD TESTING

BACKGROUND OF THE INVENTION

The invention relates to apparatus for testing the form of gear teeth in which a probe or feeler is movable along the tooth flanks of a workpiece and evaluation of the measurements thus obtained is performed using an electronic computer in which the measurements are compared, according to the progress of the relative movement between the tooth flank and the feeler, with reference values to establish differences between the reference values and actual measured values.

In one known gearwheel tester, the gearwheel to be tested is secured to a base circle disc, which rolls on a fixed generating straight edge. A probe or stylus is arranged on a fixed support and has a contact point with the gear at the starting point of the involute tooth profile on the base circle that agrees with the point of contact between base circle disc and generating straight edge. The probe deflects with deviation of the tooth profile from the involute during the rolling of the testing wheel and as a result indicates the difference between tooth profile and theoretical involute. However, such appliances are only suitable for testing gearwheels of limited diameter, perhaps up to one meter or slightly more, since firstly the base circle disc can only be made up to a limited diameter for technical manufacturing and precision reasons, and secondly the weight of the wheel being tested and rolling on the generating straight edge cannot be unlimited. These restrictions also exist with appliances of which the base circle is adjustable with lever transmissions and auxiliary slides.

For the testing of the profiles of larger gearwheels, appliances are also known in which a base circle segment is fixed on a stationary test wheel or gear and the involute profile is then tested with a probe or stylus, the support of which rolls with a generating straight edge on a base circle segment. Such base circle segments, are however costly and can only be used for a quite specific base circle size, are not capable of being easily centred relatively to the axis of the gearwheel to be tested, and moreover the rolling of the appliance is not capable of being easily controlled, because of its size, so that also here the diameters of the gears that can be tested are also restricted in practice.

Another testing apparatus has been proposed in which the rotation of the gear to be tested is established by means of an angle detector and the associated linear movement of the stylus is measured with a straight edge or linear detector. The pulses of the angle detector and of the linear detector are fed to a digital computer, which compares the measured values with the theoretical involutes and records the calculated deviations by a digital or analog procedure. The necessary rotation of the test wheel or gear, however, also in this case sets limitations as regards diameter and weight (Japanese Specification as laid open No. 18 790/1972).

SUMMARY OF THE INVENTION

The invention has for its object to provide an apparatus that makes possible the testing of profiles and the tooth angles of gears of practically any desired size and weight.

The present invention provides gear testing apparatus in which a probe or feeler is movable along a tooth flank of a workpiece and the measurement values are fed to a computer which compares said values with reference values to establish deviations from the reference values. The probe or feeler is supported through three support members which provide freedom of movement in respective co-ordinate directions so that the feeler or probe is displaceable thereby in a spatial co-ordinate system. The measurement values are obtained in one arrangement by employing all the reference values to move the probe or feeler which is then allowed to be displaced relative to said support members by deviations in the tooth form along the line of trace of the feeler, said deviations being transmitted to the computer for evaluation. In an alternative arrangement one of said support members is displaceable by biassing means to hold the probe or feeler against the tooth flank and its displacements as the probe or feeler is progressed over the flank by a drive to the other support members are compared with reference values in the direction of movement of said one member to establish deviations in said direction.

Using such apparatus, not only is it possible to test involute profiles, but also other profiles which can be expressed in mathematical form.

BRIEF DESCRIPTION OF THE DRAWINGS

The invention will be more particularly described by way of example with reference to the accompanying diagrammatic drawings, in which.

DETAILED DESCRIPTION OF THE PREFERRED EMBODIMENTS

Figure 1:
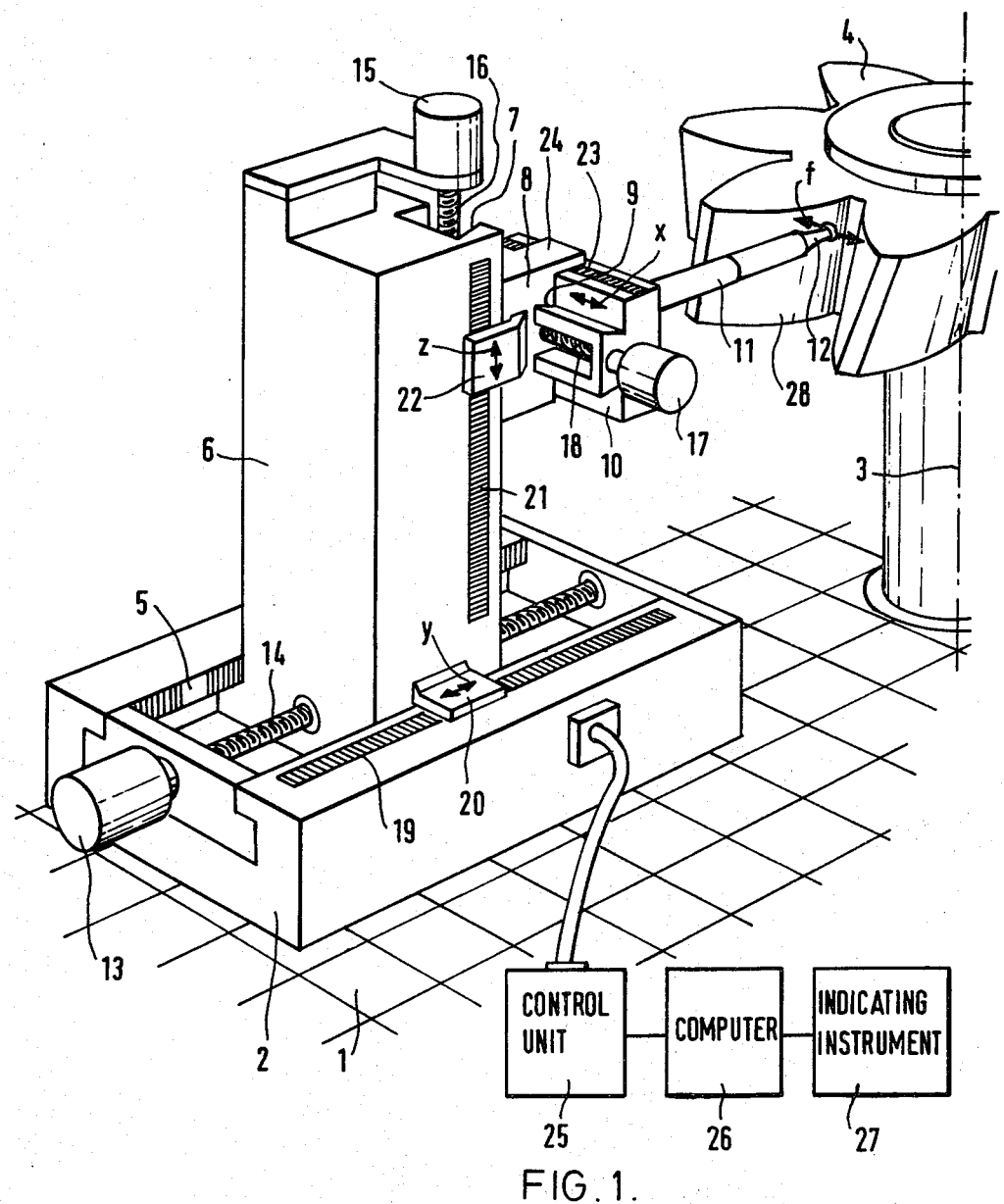
FIG. 1 is a perspective view of a first form of apparatus according to the invention in which a servo-motor is provided for each of the three co-ordinate directions of movement of the probe or feeler.

Referring to FIG. 1 of the drawings, a base plate 2 of the testing apparatus is fixed in place on a gear production or testing machine 1 in a set position in relation to central axis 3 of a workpiece 4. Slidably mounted in a guideway 5 of the base plate 2 is a pedestal 6 functioning as a measurement carriage in a co-ordinate direction y. The pedestal 6 has a vertical guideway 7, in which a slide 8 is arranged to be displaceable to function as a measurement carriage in a co-ordinate direction z. The slide 8 itself comprises a horizontal guideway 9 in which is displaceably arranged a slide 10 as a measurement carriage in the co-ordinate direction x and mounted on the slide 10 is a probe or feeler 11 comprising a tip element or stylus 12 the position of which is to be controlled in the co-ordinate system x-y-z.

Provided for movements of the feeler 10 in the respective co-ordinate directions x, y and z are three servo-motors namely a servo-motor 13, which moves the pedestal 6 in the y-direction through a threaded spindle 14;

a servo-motor 15, which moves the slide 8 in the z-direction through a threaded spindle 16, and a servo-motor 17, which moves the slide 10 in the x-direction through a threaded spindle 18.

Furthermore, for the movements in each of the co-ordinate directions x, y and z there is provided a graduated scale and an index plate, namely a graduated scale 19 for the y-direction fixed on the base plate 2, and an associated index plate 20 fixed on the pedestal 6;

a graduated scale 21 for the z-direction fixed on the pedestal 6, and an associated index plate 22 fixed on the slide 8;

a graduated scale 23 for the x-direction fixed on the slide 10 and an associated index plate 24 fixed on the slide 8.

The scales and their indexes serve to provide signals indicating the positions of adjustment of the probe or feeler in the spatial co-ordinate system. For this purpose, they may advantageously comprise devices having capacitative sensing such as are disclosed in Swiss Pat. No. 550 378 and U.S. Application Ser. No. 395,132, but can also comprise devices having known forms of optical and/or electronic sensing.

The tip element or stylus 12 of the probe or feeler 11 is displaceable transversely of the direction of projection of the feeler, as indicated by the arrows f, relative to a supporting part of the probe or feeler that is fixed to the slide 10. Said movement takes place against the action of a resilient connection between said tip element and said supporting part and measurement means are provided for providing electrical signals in dependence upon said relative movement of the tip element. Such an arrangement of a probe or feeler is itself known in the art. Further description and illustration exemplifying the arrangement is to be found in co-pending U.S. application Ser. No. 505,907 (corresponding to Swiss patent application 13253/73 of the 14th September 1973) in the name of Heinz E. Ruffner that has been filed simultaneously herewith and the disclosure of the specification of that application is incorporated herein by reference.

The apparatus further comprises an electronic control unit 25, connected to which is a computer 26, preferably a digital computer, and an indicating instrument 27. Connections are provided between these units and the servomotors, the scale indexes and the feeler measurement means.

Simply as one example of the use of the apparatus described, for testing the transverse profile of a flank 28 of the workpiece 4 the computer 26, by means of a programme stored in it and through the electronic control unit 25, controls the servo-motors 13 and 17 in the x and y directions on the basis of the programme data for the transverse profile feedback signals from the graduated scales 19 and 23 and their index plates 20 and 24 monitoring the movements and if required to regulate the operation of the servomotors accordingly. If the profile deviates from the reference values of the programme, the tip element 12 deflects in the f-direction and in accordance with the resulting signal from the feeler measurement means the corresponding deviation of the actual value from the reference value is shown in the indicating instrument 27.

As another example of use, if the tooth angle of the flank 28 is to be tested, then the computer 26, through the electronic control unit 25, controls the servo-motor 15 with a constant speed in the z-direction, the actual position of the feeler member 12 being established by means of the graduated scale 21 and its index plate 22 analogously to the first example. Simultaneously, the two servo-motors 13 and 17 are so operated by the computer 26 and the control unit 25 that the tip element 12 is moved along the helix corresponding to the tooth angle at the radius of the feeler trace. Any deviations of the profile of the flank 28 from the required form appear in the indicating unit 27 as a result of the deflection of the tip element 12 in the f-direction.

It is also possible in principle, using the apparatus as described, to test any arbitrary combination of profile and tooth angle by suitable inputs into the computer.

Since the deviations of the flank 28 are measured in the f-direction and this direction is not always at right-angles to the tooth flank, correction values for the difference between f-direction measurements and true deviations in a direction at right-angles to the flank can likewise be taken into account in the inputs into the computer. Nevertheless, this will be scarcely necessary in most cases, since the difference between the deviation in the f-direction and the deviation $f_n$ at right-angles to the flank will normally be negligibly small. This difference is expressed by the relationship $$f_n = f \cos \alpha$$

where the angle $\alpha$ is the angle between the feeler deflection direction and the perpendicular to the flank surface at the feeler contact point.

Figure 2:
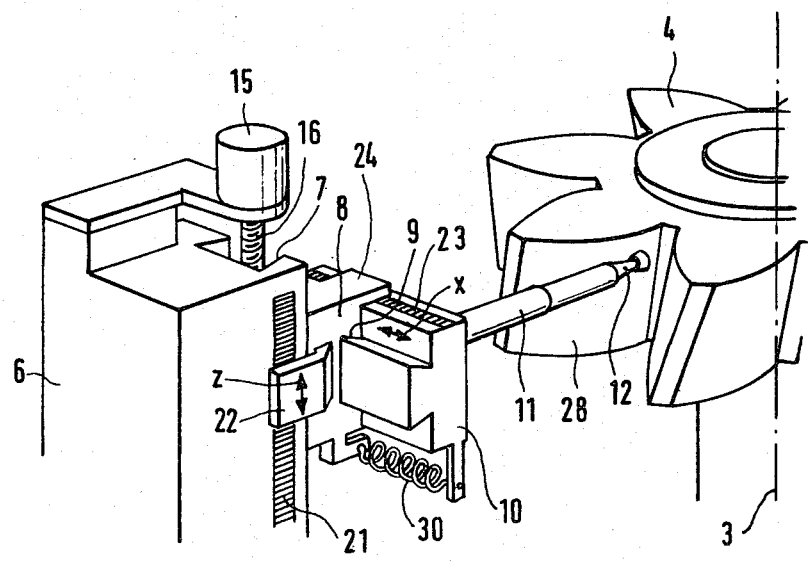
FIG. 2 is a perspective view of the upper part of a second form of apparatus according to the invention having two servo-motors for two co-ordinate directions of movement and resilient means for applying an uncontrolled displacement in the third co-ordinate direction of movement.

In the embodiment of the invention that is shown in FIG. 2, the lower part of the apparatus is identical with that shown in FIG. 1 and has therefore been omitted for simplicity. In the illustrated portion of the apparatus, parts similar to those already described are given the same reference numbers.

In FIG. 2, the slide 10 is not moved by the servo-motor 17 and spindle 18 shown in FIG. 1 but there is provided instead a spring 30 as a means for applying an uncontrolled auxiliary force. This spring 30 has one fixing point on the slide 10 and the other on the slide 8. It thus continuously urges the slide 10 in one sense in the x direction, thereby causing the feeler member to be applied with a gentle pressure to the flank 28. In this arrangement, unlike that in FIG. 1, the tip element is integral with or rigidly fixed to the main part of the probe or feeler and moves as a unit therewith.

For testing the transverse profile of the flank 28, the servo-motor 13, through the spindle 14, draws the feeler member 12 horizontally over the flank 28. By way of the signals from the index plates 20 and 24, the actual trace of the profile is compared via the computer 26 with the reference values which have been stored there and any deviations are shown in the indicating instrument 27.

For testing the tooth angle of the flank 28 on a specified cylindrical envelope (as a test which is usually most expedient), the computer 26, through the electronic control unit 25, drives the servo-motor 15 at a constant speed in the z-direction and the position of the feeler member 12 is monitored by means of the graduated scale 21 and its index plate 22. At the same time, the servo-motor 13 is so driven through the computer 26 and the control unit 25 that the feeler 11 is moved over the helical line on which the tooth angle is to be measured, i.e., on the selected cylindrical envelope. Due to the pressure of the spring 30, the tip element 12 of the probe or feeler 11 bears against the flank 28, and through the graduated scale 23 and its index plate 24 x position signals are generated, these measurements of the actual trace of the tooth angle being compared through the computer 26 with the reference values already in the computer. Any deviations are shown as a difference in the indicating instrument.

With the examples described above it has been assumed that there is a co-ordinate system consisting of three co-ordinate directions at right angles to one another. It is however also possible for another co-ordinate system to be chosen, for example, a polar co-ordinate system in which measurements in the horizontal plane are obtained as a radial distance and an angle.

Due to the fact that the apparatus is independent of the gear being tested and the gear is stationary during the testing of a tooth flank, it is possible for gears of any desired size and weight to be tested both as regards transverse profile, tooth angle or any arbitrary surface traces while mounted in the gear production machine itself or subsequently.

What I claim and desire to secure by Letters Patent is:

1. Apparatus for testing the contour of a gear tooth flank comprising:
   means fixedly mounting a gear containing said tooth flank to be tested and holding said gear stationary during testing of said tooth flank;
   probe means adapted to be moved along said flank in contact therewith while said gear is held stationary for sensing the contour of said flank;
   a support mechanism having said probe means operatively associated therewith for moving said probe means along a predetermined path in accordance with a control program determining said path;
   control means actuating said support mechanism to move said probe means along said path, said control means including means defining a predetermined path of movement for said probe means corresponding with a standard tooth flank contour;
   said support mechanism comprising
      a fixed base,
      a first support member displaceably mounted on said base for movement relative thereto in a first direction,
      a second support member displaceably mounted on said first support member for movement relative thereto in a second direction,
      a third support member having said probe means thereon displaceably mounted relative to said second support member for movement in a third direction,
      said first, said second and said third directions of movement of said first, said second and said third support members, respectively, defining a three dimensional spatial co-ordinate system through which said probe means moves during testing of said gear flank, and
      drive means responsive to said control means for individually moving each of said first, said second and said third support members, respectively, in said first, said second and said third directions continuously during testing of said tooth flank simultaneously therewith thereby to effect movement of said probe means along said predetermined path defined by said control program and within said three dimensional spatial co-ordinate system while said gear is held stationary;
   resilient means acting between said probe means and said third support member to maintain said probe means in engagement with said stationary gear tooth flank, said probe means being displaceable against the force of said resilient means relative to said third support member in a direction transverse to said tooth flank;
   sensing means responsive to displacement of said probe means relative to said third support member; and
   evaluation means operatively associated with said control means and said sensing means for determining deviations in movement of said probe means from said predetermined path corresponding with said standard tooth flank contour in order to determine thereby deviations from the standard tooth flank contour in the tooth flank being tested.

2. Apparatus according to claim 1 further comprising respective position detection means for each of the three support members, said detection means being connected to said evaluation means for regulation of said control means whereby said drive means are operated in dependence upon variations between programmed support member positions stored in said evaluation means and actual support member positions indicated by said detector means.

3. Apparatus according to claim 1 wherein said probe means comprises a contact element engaging directly with said tooth flank of a gear being tested and a support element on which said contact element is displaceably mounted, said resilient means acting between said contact element and said support element to maintain said contact element in engagement with said gear flank.

4. Apparatus according to claim 3 wherein said sensing means are responsive to displacement of said contact element relative to said support element.

5. Apparatus for testing the contour of a gear tooth flank comprising:
   means fixedly mounting a gear containing said tooth flank to be tested and holding said gear stationary during testing of said tooth flank;
   probe means adapted to be moved along said flank in contact therewith while said gear is held stationary for sensing the contour of said flank;
   a support mechanism having a said probe means operatively associated therewith for moving said probe means along a predetermined path in accordance with a control program determining said path;
   control means actuating said support mechanism to move said probe means along said path, said control means including means defining a predetermined path of movement for said probe means corresponding with a standard tooth flank contour;
   said support mechanism comprising
      a fixed base,
      a first support member displaceably mounted on said base for movement relative thereto in a first direction,
      a second support member displaceably mounted on said first support member for movement relative thereto in a second direction,
      a third support member having said probe means thereon displaceably mounted relative to said second support member for movement in a third direction,
      said first, said second and said third directions of movement of said first, said second and said third support members respectively, defining a three dimensional spatial co-ordinate system through which said probe means moves during testing of said gear flank, biassing means acting unidirectionally on one of said support members to urge said one support member continuously toward an end position in its direction of movement relative to the support member upon which it is mounted, and drive means responsive to said control means for individually moving each of the other two of said first, said second and said third support members, respectively, in the direction of displacement of said other two support members relative to the support member upon which each is mounted continuously during testing of said tooth flank simultaneously therewith thereby to effect movement of said probe means along said predetermined path defined by said control program and within said three dimensional spatial co-ordinate system while said gear is held stationary;

resilient means acting between said probe means and said third support member to maintain said probe means in engagement with said stationary gear tooth flank, said probe means being displaceable relative to said third support member against the force of said resilient means in a direction transverse to said gear tooth flank;

sensing means responsive to displacement of said probe means relative to said third support member; and evaluation means operatively associated with said control means and said sensing means for determining deviations in the movement of said probe means from said predetermined path corresponding with said standard tooth flank contour in order to determine thereby deviations from the standard tooth flank contour in the tooth flank being tested.

6. Apparatus according to claim 5 further comprising position detection means for the respective support members provided with drive means, said detection means being connected to said evaluation means for regulation of said control means whereby said drive means are operated in dependence upon variations between programmed support member positions stored in said evaluation means and actual support member positions indicated by said detector means.

7. Apparatus according to claim 5 wherein the first and second support members are provided with respective drive means and said biassing means act between the second and third support members.

* * * * *